United States Patent
Katsuura et al.

(10) Patent No.: US 10,001,071 B2
(45) Date of Patent: Jun. 19, 2018

(54) CONTROL SYSTEM AND CONTROL METHOD FOR INTERNAL COMBUSTION ENGINE

(71) Applicant: HONDA MOTOR CO., LTD., Tokyo (JP)

(72) Inventors: Akihiro Katsuura, Wako (JP); Masaki Ueno, Wako (JP); Yosuke Kosaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 15/500,543

(22) PCT Filed: Apr. 9, 2015

(86) PCT No.: PCT/JP2015/061089
§ 371 (c)(1),
(2) Date: Jan. 31, 2017

(87) PCT Pub. No.: WO2016/017214
PCT Pub. Date: Feb. 4, 2016

(65) Prior Publication Data
US 2017/0218864 A1 Aug. 3, 2017

(30) Foreign Application Priority Data

Aug. 1, 2014 (JP) .................................. 2014-157380

(51) Int. Cl.
*F02B 47/08* (2006.01)
*F02D 41/00* (2006.01)
(Continued)

(52) U.S. Cl.
CPC ......... *F02D 41/0072* (2013.01); *F02M 26/47* (2016.02); *F02D 41/0047* (2013.01);
(Continued)

(58) Field of Classification Search
CPC ......... F02D 2021/083; F02D 2021/086; F02D 2041/0067; F02D 2041/007;
(Continued)

(56) References Cited

U.S. PATENT DOCUMENTS

| 2004/0025838 A1* | 2/2004 | Fuwa | F01L 1/022 |
| | | | 123/406.41 |
| 2005/0197762 A1* | 9/2005 | Yoshino | F02D 35/028 |
| | | | 701/111 |

(Continued)

FOREIGN PATENT DOCUMENTS

| JP | 2007-146785 A | 6/2007 |
| JP | 2011-149351 A | 8/2011 |

(Continued)

OTHER PUBLICATIONS

International Search Report dated Jul. 14, 2015 corresponding to International Patent Application No. PCT/JP2015/061089 and English translation thereof.

*Primary Examiner* — John Kwon
(74) *Attorney, Agent, or Firm* — Squire Patton Boggs (US) LLP

(57) ABSTRACT

A control system and a control method for an internal combustion engine, which are capable of accurately calculating an in-cylinder gas amount and an EGR ratio by a relatively simple method even in a case where an in-cylinder gas temperature is changed by execution of internal EGR, and properly controlling the engine using the EGR ratio thus calculated. An in-cylinder gas amount Gact actually filled in the cylinder is calculated by correcting an ideal in-cylinder gas amount Gth, which is an amount of gases filled in a cylinder in an ideal state in which it is assumed that no exhaust gases of the engine are recirculated into the cylinder, using an ideal in-cylinder gas temperature Tcylth according to an in-cylinder gas temperature Tcyl, and an EGR ratio
(Continued)

REGRT is calculated using the in-cylinder gas amount Gact and an intake air amount Gaircyl.

14 Claims, 12 Drawing Sheets

(51) Int. Cl.
*F02M 26/47* (2016.01)
*F02M 26/45* (2016.01)
*F02M 26/46* (2016.01)

(52) U.S. Cl.
CPC ..... *F02D 2041/0075* (2013.01); *F02M 26/45* (2016.02); *F02M 26/46* (2016.02)

(58) Field of Classification Search
CPC ......... F02D 2041/0075; F02D 35/0015; F02D 41/0047; F02D 41/0052; F02D 41/0062; F02D 41/0072; F02M 26/61
USPC ............ 701/108, 109; 123/435, 436, 406.23, 123/406.36, 568.11, 568.21
See application file for complete search history.

(56) References Cited

U.S. PATENT DOCUMENTS

| | | | |
|---|---|---|---|
| 2007/0044781 A1* | 3/2007 | Nakayama | F02D 35/026 123/704 |
| 2008/0162020 A1* | 7/2008 | Itoga | F01L 1/185 701/108 |
| 2008/0319633 A1* | 12/2008 | Moriya | F02D 35/023 701/103 |
| 2011/0005491 A1* | 1/2011 | Terada | F02D 35/026 123/299 |
| 2015/0211961 A1* | 7/2015 | Ueno | F02D 13/0261 73/114.22 |
| 2016/0053702 A1* | 2/2016 | Nada | F02D 41/403 123/294 |

FOREIGN PATENT DOCUMENTS

| | | |
|---|---|---|
| JP | 5270008 B2 | 8/2013 |
| JP | 2014-013024 A | 1/2014 |
| WO | WO 2011/074302 A1 | 6/2011 |

* cited by examiner

F I G. 9
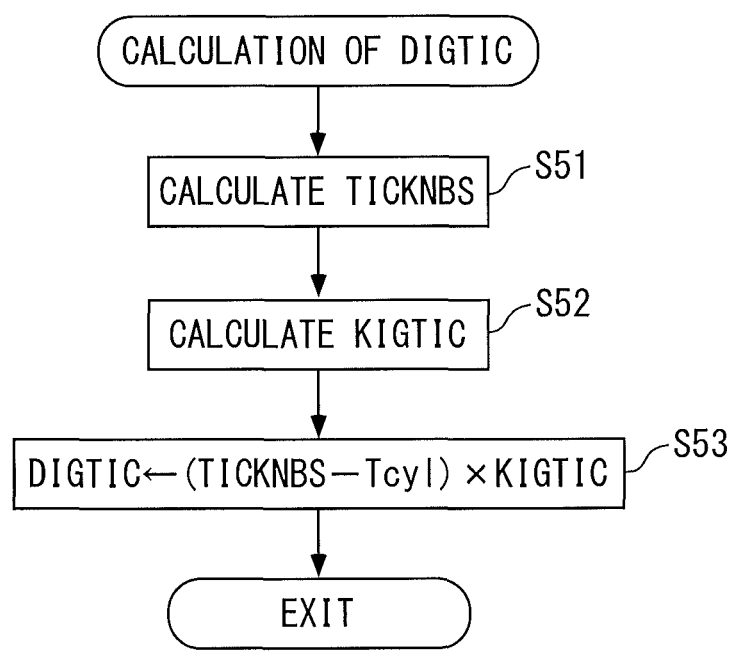

CONTROL SYSTEM AND CONTROL METHOD FOR INTERNAL COMBUSTION ENGINE

TECHNICAL FIELD

The present invention relates to a control system and a control method for an internal combustion engine, and more particularly to a control system and a control method for an internal combustion engine, which control the engine based on an EGR ratio indicative of a ratio of exhaust gases (burned gases) contained in gases filled in a cylinder.

BACKGROUND ART

Conventionally, as a control system of this kind, there has been known one disclosed e.g. in PTL 1 filed by the present applicant. In this control system, a fully-open intake air amount, which is an amount of intake air in a case where a throttle valve is in a fully-open state, is calculated according to a rotational speed of an internal combustion engine, and then a stoichiometric intake air amount, which is associated with an ideal state in which no exhaust gases are assumed to be recirculated into a combustion chamber, is calculated according to the fully-open intake air amount and an intake pressure. Then, an EGR ratio is calculated using the above stoichiometric intake air amount and an actual intake air amount of air actually drawn into the cylinder. By calculating the EGR ratio as described above, it becomes unnecessary to set in advance a large number of maps associated with various operating states of the engine, whereby the number of map setting steps can be largely reduced. The calculated EGR ratio is used for control of the engine, such as ignition timing control.

CITATION LIST

Patent Literature

[PTL 1] Japanese Patent Publication No. 5270008

SUMMARY OF INVENTION

Technical Problem

In the above-described control system, although the fully-open intake air amount and the intake pressure are used for calculating the stoichiometric intake air amount, a temperature of gases in the cylinder (hereinafter referred to as the "in-cylinder gas temperature") is not reflected on the stoichiometric intake air amount. That is, the stoichiometric intake air amount is calculated on a precondition that the in-cylinder gas temperature is constant. However, for example, in a case where a relatively large amount of exhaust gas recirculation (EGR) is introduced, this causes a rise in the in-cylinder gas temperature to reduce an actual in-cylinder gas amount (mass).

For this reason, in the calculation method by the above-described control system, the stoichiometric intake air amount is calculated to be a slightly larger value than the actual in-cylinder gas amount, and accordingly the EGR ratio calculated using the stoichiometric intake air amount is overestimated. As a consequence, the ignition timing is controlled using the EGR ratio such that it is more advanced, which sometimes causes knocking. This is particularly conspicuous e.g. in such a case where internal EGR of a large amount of exhaust gases is performed by changing operation phases of both an intake valve and an exhaust valve.

The present invention has been made to provide a solution to the above-described problems, and an object thereof is to provide a control system and a control method for an internal combustion engine, which are capable of accurately calculating an in-cylinder gas amount and an EGR ratio by a relatively simple method even in a case where an in-cylinder gas temperature is changed by execution of internal EGR, and properly controlling the engine using the EGR ratio thus calculated.

Solution to Problem

To attain the above object, the invention according to claim 1 is a control system for an internal combustion engine that draws air into a cylinder via a throttle valve 6 provided in an intake passage (intake pipe 4 in the embodiment (hereinafter, the same applies throughout this section)), and performs internal EGR for recirculating exhaust gases of the engine 1, which have been caused to flow back from an exhaust passage (exhaust pipe 5) into the intake passage by overlap of an intake valve and an exhaust valve, into the cylinder, the control system comprising rotational speed-detecting means (crank angle sensor 17) for detecting a rotational speed NE of the engine, intake pressure-detecting means (intake pressure sensor 11) for detecting an intake pressure PBA in the engine, reference in-cylinder gas amount-calculating means (ECU 2, steps 11 to 13) for calculating a reference in-cylinder gas amount Gstd, which is an amount of gases filled in the cylinder in a reference state in which the throttle valve is fully open, according to the rotational speed of the engine, ideal in-cylinder gas amount-calculating means (ECU 2, step 14) for calculating an ideal in-cylinder gas amount Gth, which is an amount of gases filled in the cylinder in an ideal state in which it is assumed that no exhaust gases of the engine are recirculated into the cylinder, according to the reference in-cylinder gas amount Gstd and the intake pressure PBA, ideal in-cylinder gas temperature-calculating means (ECU 2, step 2) for calculating a temperature (ideal in-cylinder gas temperature Tcylth, reference in-cylinder gas temperature Tcylstd) of in-cylinder gases in the ideal state, in-cylinder gas temperature-calculating means (ECU 2, step 3) for calculating a temperature (in-cylinder gas temperature Tcyl) of actual in-cylinder gases filled in the cylinder, in-cylinder gas amount-calculating means (ECU 2, step 4) for calculating an amount (in-cylinder gas amount Gact) of in-cylinder gases actually filled in the cylinder, by correcting the ideal in-cylinder gas amount Gth using the ideal in-cylinder gas temperature Tcylth (reference in-cylinder gas temperature Tcylstd) according to the in-cylinder gas temperature Tcyl, intake air amount-obtaining means (intake air amount sensor 9) for obtaining an intake air amount Gaircyl actually drawn into the cylinder, and EGR ratio-calculating means (ECU 2, step 5) for calculating an EGR ratio REGRT, which is a ratio of an EGR amount (Gact−Gaircyl) to the in-cylinder gas amount Gact, using the in-cylinder gas amount Gact and the intake air amount Gaircyl.

With this configuration, the amount of gases filled in the cylinder in the reference state in which the throttle valve is fully open is calculated as the reference in-cylinder gas amount according to the rotational speed of the engine. In the reference state, the throttle valve is in the fully-open state, whereby there is almost no pressure difference between the exhaust side and the intake side, and hence there occurs no back-flow of exhaust gases from the exhaust side to the intake side even in a state in which the intake valve and the exhaust valve are opened at the same time by overlap, and the internal EGR amount due to blow-back from the intake side becomes approximately equal to 0. On the other hand, in the reference state, not only the intake air but also remaining burned gases remaining in the cylinder in a state in which a piston of the cylinder is in a top dead center position exist in the cylinder. Therefore, the reference in-cylinder gas amount is equal to the sum of the intake air amount and an amount of the remaining burned gases.

Further, according to the present invention, the amount of gases filled in the cylinder in the ideal state in which it is assumed that no exhaust gases are recirculated into the cylinder is calculated as the ideal in-cylinder gas amount according to the reference in-cylinder gas amount and the intake pressure. Since the ideal state is the state in which it is assumed that no exhaust gases are recirculated into the cylinder, i.e. a state in which it is assumed that the intake air and the remaining burned gases are filled in the cylinder, the in-cylinder gas temperature in the ideal state is equal to the in-cylinder gas temperature in the above-mentioned reference state. From the relationship between the reference state and the ideal state that the in-cylinder gas temperature is fixed, as described above, and the equation of state of gas, the ideal in-cylinder gas amount in the ideal state changes in a manner proportional to an intake pressure at the time, with the reference in-cylinder gas amount in the reference state being the maximum value thereof. Therefore, by calculating the ideal in-cylinder gas amount according to the reference in-cylinder gas amount and the intake pressure as described above, it is possible to perform calculation of the ideal in-cylinder gas amount with high accuracy.

Furthermore, according to the present invention, the ideal in-cylinder gas temperature, which is a temperature of the in-cylinder gases in the ideal state, is calculated, and the temperature of the actual in-cylinder gases filled in the cylinder is calculated. Further, the in-cylinder gas amount actually filled in the cylinder is calculated by correcting the ideal in-cylinder gas amount using the ideal in-cylinder gas temperature according to the in-cylinder gas temperature. When the ideal state in which no exhaust gases are recirculated into the cylinder and the cylinder is filled with only intake air, and an actual state in which exhaust gases are recirculated into the cylinder in addition to intake air are compared under the condition of the same intake pressure, since pressure (intake pressure) and volume (cylinder volume) are the same in the equation of state of gas, there holds the following equation (A):

$$\text{ideal in-cylinder gas amount} \times \text{ideal in-cylinder gas temperature} = \text{actual in-cylinder gas amount} \times \text{actual in-cylinder gas temperature} \quad (A)$$

By correcting the ideal in-cylinder gas amount using the ideal in-cylinder gas temperature according to the actual in-cylinder gas temperature, it is possible to accurately calculate the actual in-cylinder gas amount from the above equation (A).

Then, in the present invention, the EGR ratio is calculated using the in-cylinder gas amount calculated as described above, and the obtained actual intake air amount. From the above, according to present invention, even in a case where the in-cylinder gas temperature is changed by execution of the internal EGR, it is possible to accurately calculate the in-cylinder gas amount and the EGR ratio by a relatively simple method, and it is possible to properly control the engine using the EGR ratio thus calculated.

The invention according to claim 2 is the control system according to claim 1, further comprising intake air temperature-detecting means (intake air temperature sensor 10) for detecting a temperature of air drawn into the cylinder as an intake air temperature Ta, exhaust gas temperature-obtaining means (ECU 2) for detecting or estimating a temperature of exhaust gases of the engine and obtaining the temperature of the exhaust gases as an exhaust gas temperature Tex, and internal EGR amount-calculating means (ECU 2, step 24) for calculating an internal EGR amount Ginegr using the ideal in-cylinder gas temperature Tcylth (reference in-cylinder gas temperature Tcylstd), the ideal in-cylinder gas amount Gth, the intake air temperature Ta, the intake air amount Gaircyl, and the exhaust gas temperature Tex, and wherein said in-cylinder gas temperature-calculating means calculates the in-cylinder gas temperature Tcyl based on the intake air amount Gaircyl, the intake air temperature Ta, the internal EGR amount Ginegr, and the exhaust gas temperature Tex (step 25).

In the actual state in which exhaust gases due to the internal EGR are recirculated into the cylinder together in addition to intake air, from an equilibrium relationship in temperature in the cylinder, there holds the following equation (B):

$$\text{actual in-cylinder gas temperature} \times \text{actual in-cylinder gas amount} = \text{intake air temperature} \times \text{intake air amount} + \text{exhaust gas temperature} \times \text{internal EGR amount} \quad (B)$$

Further, when the left side of the equation (B) is replaced by the left side of the equation (A), from the equation (B) and the above-mentioned equation (A), there holds the following equation (C):

$$\text{ideal in-cylinder gas temperature} \times \text{ideal in-cylinder gas amount} = \text{intake air temperature} \times \text{intake air amount} + \text{exhaust gas temperature} \times \text{internal EGR amount} \quad (C)$$

Therefore, with this configuration, based on the equation (C), the internal EGR amount can be calculated using the five parameters other than the internal EGR amount, including the ideal in-cylinder gas temperature and ideal in-cylinder gas amount already calculated in claim 1, and the detected or obtained intake air temperature and exhaust gas temperature. Further, when the internal EGR amount is thus calculated, the actual in-cylinder gas amount of the equation (B) is represented by the sum of the intake air amount and the internal EGR amount, and hence, based on the equation (B), the actual in-cylinder gas temperature can be calculated using the four parameters other than the actual in-cylinder gas amount, including the internal EGR amount, with high accuracy.

The invention according to claim 3 is the control system according to claim 2, wherein the engine includes a variable intake and exhaust valve operation phase mechanism (valve operation characteristic variable device 3) for changing the internal EGR amount by changing operation phases CAIN and CAEX of the intake valve and the exhaust valve, and wherein relationships between the rotational speed NE of the engine and the operation phases (CAIN and CAEX) of the intake valve and the exhaust valve, and the reference in-cylinder gas amount Gstd and a reference in-cylinder gas temperature Tcylstd, which is a temperature of in-cylinder gases in the reference state, are set and stored, based on measured data of an experiment performed in advance, and elements of the engine, the control system further comprising operation phase-obtaining means (intake cam angle sensor 18 and exhaust cam angle sensor 19) for obtaining the operation phases of the intake valve and the exhaust valve, and wherein the reference in-cylinder gas amount-calculating means calculates the reference in-cylinder gas amount (steps 11 to 13), and the ideal in-cylinder gas temperature-calculating means calculates the reference in-cylinder gas temperature as the ideal in-cylinder gas temperature (step 2), based on the stored relationships, according to the detected rotational speed of the engine and the obtained operation phases of the intake valve and the exhaust valve.

With this configuration, the variable intake and exhaust valve operation phase mechanism changes the internal EGR amount by changing the operation phases of the intake valve and the exhaust valve. According to the present invention, the relationship between the rotational speed of the engine, the operation phase of the intake valve, and the operation phase of the exhaust valve, and the reference in-cylinder gas amount, and the relationship between the above-mentioned three parameters and the reference in-cylinder gas temperature (temperature of in-cylinder gases in the reference state) are set and stored based on the measured data of the experiment performed in advance, and the elements of the engine. Since the reference state is a relatively simple state in which the throttle valve is fully open, and intake air and remaining burned gases are filled in the cylinder, the reference in-cylinder gas amount and the reference in-cylinder gas temperature in this state can be easily and accurately set based on the measured data and the elements of the engine.

Further, according to the present invention, the reference in-cylinder gas amount is calculated based on the above-described stored relationship, according to the rotational speed of the engine detected during operation of the engine and the operation phases of the intake valve and the exhaust valve obtained during operation of the engine, and hence it is possible to perform calculation of the reference in-cylinder gas amount easily with high accuracy. Further, as described hereinabove, the ideal in-cylinder gas temperature is in equal relationship to the reference in-cylinder gas temperature. From this relationship, the reference in-cylinder gas temperature is determined and calculated as the ideal in-cylinder gas temperature, based on the stored relationship, according to the detected or obtained three parameters described above, and hence it is possible to perform calculation of the ideal in-cylinder gas temperature easily with high accuracy.

The invention according to claim 4 is the control system according to claim 3, wherein the reference in-cylinder gas amount Gstd is set as the sum (Gaircyl+Gegrd) of the intake air amount Gaircyl in the reference state and a remaining burned gas amount Gegrd of remaining burned gases remaining in the cylinder in a state in which a piston of the cylinder is in a top dead center position.

As described above, in a state in which the piston has reached the top dead center position at the time of termination of an exhaust stroke of the engine, part of burned gases is not discharged from the cylinder but remains as remaining burned gases between the piston and a cylinder head. With this configuration, since the reference in-cylinder gas amount is set as the sum of the intake air amount and the remaining burned gas amount in the reference state, it is possible to properly set the reference in-cylinder gas amount while causing the influence of the remaining burned gases to be reflected thereon, and it is possible to more accurately calculate the in-cylinder gas amount, the in-cylinder gas temperature, and so forth, using the set reference in-cylinder gas amount.

The invention according to claim 5 is the control system according to any one of claims 2 to 4, the engine further includes an external EGR device (EGR pipe 13, EGR control valve 14) that performs external EGR for recirculating exhaust gases discharged from the cylinder into the exhaust passage, into the intake passage via an EGR passage, the control system further comprising external EGR amount-calculating means (ECU 2, step 21) for calculating an external EGR amount Gexegr, and external EGR temperature-obtaining means (ECU 2, step 22) for detecting or estimating an external EGR temperature Tegr (intake air temperature Ta+temperature rise amount DTegr), and wherein the in-cylinder gas temperature-calculating means calculates the in-cylinder gas temperature Tcyl, further using the external EGR amount Gexegr and the external EGR temperature (intake air temperature Ta+temperature rise amount DTegr) (step 25).

With this configuration, in a case where the external EGR is executed in combination with the internal EGR, the in-cylinder gas temperature is calculated further using the external EGR amount and the external EGR temperature. This makes it possible to accurately calculate the in-cylinder gas temperature and the in-cylinder gas amount while causing the influence of the external EGR to be reflected thereon.

The invention according to claim 6 is the control system according to any one of claims 1 to 5, further comprising ignition timing control means (ECU 2, steps 34, 36) for controlling an ignition timing IGLOG of the engine using a knocking limit ignition timing, the ignition timing control means including basic value-calculating means (ECU 2, step 41) for calculating a basic value IGKNOCKB of the knocking limit ignition timing corresponding to a limit beyond which knocking occurs in the engine, EGR-dependent knocking correction amount-calculating means (ECU 2, step 43) for calculating an EGR-dependent knocking correction amount DEGRT according to the EGR ratio, temperature-dependent knocking correction amount-calculating means (ECU 2, step 53) for calculating a temperature-dependent knocking correction amount DIGTIC according to a difference (TICKNBS−Tcyl) between the reference in-cylinder gas temperature and the in-cylinder gas temperature, and knocking limit ignition timing-calculating means (ECU 2, step 45) for calculating the knocking limit ignition timing DIGTIC by correcting the basic value with the EGR-dependent knocking correction amount and the temperature-dependent knocking correction amount.

With this configuration, the basic value of the knocking limit ignition timing corresponding to the limit beyond which knocking occurs in the engine is calculated, the EGR-dependent knocking correction amount is calculated as a correction mount for correcting the basic value, according to the EGR ratio, and the temperature-dependent knocking correction amount is calculated according to the difference between the reference in-cylinder gas temperature and the in-cylinder gas temperature. The knocking limit ignition timing and the EGR ratio have a high correlation with each other. Further, knocking is more liable to occur as the actual in-cylinder gas temperature is higher. Therefore, by correcting the basic value with the EGR-dependent knocking correction amount and the temperature-dependent knocking correction amount calculated as described above, it is possible to properly calculate the knocking limit ignition timing according to the EGR ratio and the in-cylinder gas temperature. Further, the ignition timing can be properly controlled using the calculated knocking limit ignition timing.

The invention according to claim 7 is the control system according to claim 6, wherein the ignition timing control means further includes optimum ignition timing-calculating means (ECU 2, step 31) for calculating an optimum ignition timing IGMBT at which an output of the engine becomes maximum, according to the EGR ratio, and controls the ignition timing using one of the knocking limit ignition timing and the optimum ignition timing, which is more retarded (steps 33 to 36).

With this configuration, the optimum ignition timing is calculated according to the EGR ratio. It is confirmed that the relationship between the EGR ratio and the optimum ignition timing is not influenced by the operation phases of the intake and exhaust valves or the external EGR, and hence by the above-described calculation method, the optimum ignition timing can be easily and accurately set according to the EGR ratio. Further, since the ignition timing is controlled using one of the set optimum ignition timing and the knocking limit ignition timing, which is more retarded, it is possible to obtain a maximum output of the engine in a range within which knocking can be positively avoided.

The invention according to claim 8 is a method of controlling an internal combustion engine that draws air into a cylinder via a throttle valve 6 provided in an intake passage (intake pipe 4), and performs internal EGR for recirculating exhaust gases of the engine 1, which have been caused to flow back from an exhaust passage (exhaust pipe 5) into the intake passage by overlap of an intake valve and an exhaust valve, into the cylinder, the method comprising the steps of a) detecting a rotational speed NE of the engine, b) detecting an intake pressure PBA in the engine, c) calculating a reference in-cylinder gas amount Gstd, which is an amount of gases filled in the cylinder in a reference state in which the throttle valve is fully open, according to the rotational speed of the engine (steps 11 to 13), d) calculating an ideal in-cylinder gas amount Gth, which is an amount of gases filled in the cylinder in an ideal state in which it is assumed that no exhaust gases of the engine are recirculated into the cylinder, according to the reference in-cylinder gas amount Gstd and the intake pressure PBA (step 14), e) calculating an ideal in-cylinder gas temperature Tcylth (reference in-cylinder gas temperature Tcylstd), which is a temperature of in-cylinder gases in the ideal state (step 2), f) calculating a temperature (in-cylinder gas temperature Tcyl) of actual in-cylinder gases filled in the cylinder (step 3), g) calculating an amount (in-cylinder gas amount Gact) of in-cylinder gases actually filled in the cylinder, by correcting the ideal in-cylinder gas amount Gth using the ideal in-cylinder gas temperature Tcylth (reference in-cylinder gas temperature Tcylstd) according to the in-cylinder gas temperature Tcyl (step 4), h) obtaining an intake air amount Gaircyl actually drawn into the cylinder, and i) calculating an EGR ratio REGRT, which is a ratio of an EGR amount (Gact−Gaircyl) to the in-cylinder gas amount Gact, using the in-cylinder gas amount Gact and the intake air amount Gaircyl.

With this configuration, it is possible to obtain the same advantageous effects as provided by the invention according to claim 1.

The invention according to claim 9 is the method according to claim 8, further comprising the steps of j) detecting a temperature of air drawn into the cylinder as an intake air temperature Ta, k) obtaining a temperature of exhaust gases of the engine as an exhaust gas temperature Tex by detecting or estimating the temperature of the exhaust gases, and l) calculating an internal EGR amount Ginegr using the ideal in-cylinder gas temperature Tcylth (reference in-cylinder gas temperature Tcylstd), the ideal in-cylinder gas amount Gth, the intake air temperature Ta, the intake air amount Gaircyl, and the exhaust gas temperature Tex (step 24), and wherein in the step f), the in-cylinder gas temperature Tcyl is calculated based on the intake air amount Gaircyl, the intake air temperature Ta, the internal EGR amount Ginegr, and the exhaust gas temperature Tex (step 25).

With this configuration, it is possible to obtain the same advantageous effects as provided by the invention according to claim 2.

The invention according to claim 10 is the method according to claim 9, wherein the engine includes a variable intake and exhaust valve operation phase mechanism (valve operation characteristic variable device 3) for changing the internal EGR amount by changing operation phases CAIN and CAEX of the intake valve and the exhaust valve, and wherein relationships between the rotational speed NE of the engine and the operation phases (CAIN and CAEX) of the intake valve and the exhaust valve, and the reference in-cylinder gas amount Gstd and a reference in-cylinder gas temperature Tcylstd, which is a temperature of in-cylinder gases in the reference state, are set and stored, based on measured data of an experiment performed in advance, and elements of the engine, the method further comprising the step of m) obtaining the operation phases of the intake valve and the exhaust valve, and wherein the reference in-cylinder gas amount is calculated in the step c) (steps 11 to 13), and the reference in-cylinder gas temperature is calculated as the ideal in-cylinder gas temperature in the step e) (step 2), based on the stored relationships, according to the detected rotational speed of the engine and the obtained operation phases of the intake valve and the exhaust valve.

With this configuration, it is possible to obtain the same advantageous effects as provided by the invention according to claim 3.

The invention according to claim 11 is the method according to claim 10, wherein the reference in-cylinder gas amount Gstd is set as the sum (Gaircyl+Gegrd) of the intake air amount Gaircyl in the reference state and a remaining burned gas amount Gegrd of remaining burned gases remaining in the cylinder in a state in which a piston of the cylinder is in a top dead center position.

With this configuration, it is possible to obtain the same advantageous effects as provided by the invention according to claim 4.

The invention according to claim 12 is the method according to any one of claims 9 to 11, wherein the engine further includes an external EGR device (EGR pipe 13, EGR control valve 14) that performs external EGR for recirculating exhaust gases discharged from the cylinder into the exhaust passage, into the intake passage via an EGR passage, the method further comprising n) calculating an external EGR amount Gexegr (step 21), and 0) detecting or estimating an external EGR temperature Tegr (intake air temperature Ta+temperature rise amount DTegr), and wherein in the step f), the in-cylinder gas temperature Tcyl is calculated further using the external EGR amount Gexegr and the external EGR temperature (intake air temperature Ta+temperature rise amount DTegr) (step 25).

With this configuration, it is possible to obtain the same advantageous effects as provided by the invention according to claim 5.

The invention according to claim 13 is the method according to any one of claims 8 to 12, further comprising the steps of p) calculating a basic value IGKNOCKB of a knocking limit ignition timing corresponding to a limit beyond which knocking occurs in the engine (step 41), q) calculating an EGR-dependent knocking correction amount DEGRT according to the EGR ratio (step 43), r) calculating a temperature-dependent knocking correction amount DIGTIC according to a difference (TICKNBS−Tcyl) between the reference in-cylinder gas temperature and the in-cylinder gas temperature (step 53), s) calculating the knocking limit ignition timing IGKNOCK by correcting the basic value with the EGR-dependent knocking correction amount and the temperature-dependent knocking correction amount, and t) controlling an ignition timing IGLOG of the engine using the knocking limit ignition timing (steps 34, 36).

With this configuration, it is possible to obtain the same advantageous effects as provided by the invention according to claim 6.

The invention according to claim 14 is the method according to claim 13, wherein in the step t), an optimum ignition timing IGMBT at which an output of the engine becomes maximum is calculated, according to the EGR ratio (step 31), and the ignition timing is controlled using one of the knocking limit ignition timing and the optimum ignition timing, which is more retarded (steps 33 to 36).

With this configuration, it is possible to obtain the same advantageous effects as provided by the invention according to claim 7.

BRIEF DESCRIPTION OF DRAWINGS

FIG. 9 A flowchart of a process for calculating a temperature-dependent knocking correction amount DIGTIC.

DESCRIPTION OF EMBODIMENTS

Figure 1:
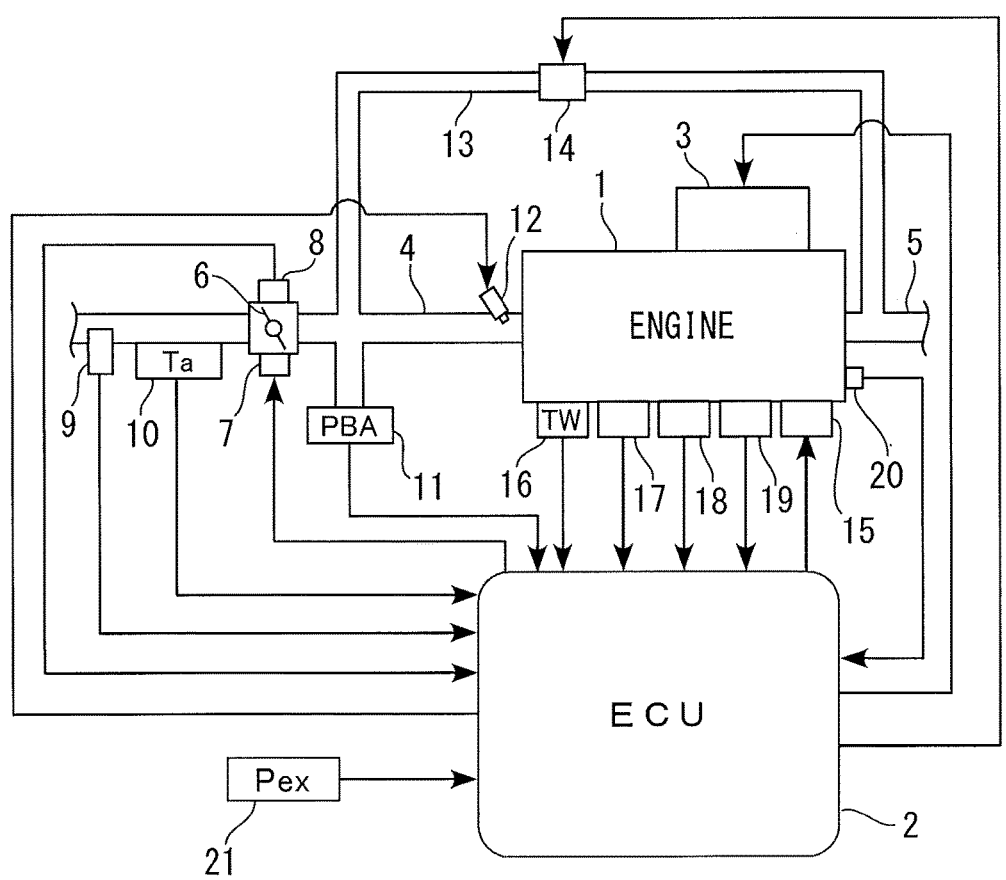
FIG. 1 A diagram schematically showing a control system according to an embodiment of the present invention together with an internal combustion engine.

The invention will now be described in detail with reference to drawings showing preferred embodiments thereof. FIG. 1 schematically shows a control system according to an embodiment of the present invention together with an internal combustion engine. The internal combustion engine (hereinafter referred to as the "engine") 1 is e.g. a four-cylinder gasoline engine for a vehicle, and includes four pairs of cylinders and pistons, and intake valves and exhaust valves (none of which are specifically shown) provided for the respective cylinders, as well as a valve operation characteristic variable device 3 including a variable cam phase mechanism which is capable of changing the phases of intake cams and exhaust cams for actuating the intake valves and exhaust valves, respectively. A variable intake cam phase mechanism is configured to continuously change the relative phase of each intake cam with respect to a crankshaft of the engine 1 toward an advanced side or a retarded side, whereby the operation phase of an associated one of the intake valves is changed. On the other hand, a variable exhaust cam phase mechanism is configured to continuously change the relative phase of each exhaust cam with respect to the crankshaft, similar to the above-mentioned intake cam, whereby the operation phase of an associated one of the exhaust valves is changed. Further, the valve operation characteristic variable device 3 also includes a variable valve lift mechanism which is capable of changing the lift amount of the intake valve between the two stages of large and small amounts.

An intake pipe 4 (intake passage) and an exhaust pipe 5 (exhaust passage) are connected to the engine 1. A throttle valve 6 is provided in the intake pipe 4, and is actuated by an actuator 7 controlled by an ECU 2. Further, the opening degree of the throttle valve 6 is detected by a throttle valve opening sensor 8, and a detection signal indicative of the detected opening degree is delivered to the ECU 2.

Further, while an intake air amount sensor 9 and an intake air temperature sensor 10 are arranged in the intake pipe 4 at respective locations upstream of the throttle valve 6, an intake pressure sensor 11 is arranged in the intake pipe 4 at a location downstream of the throttle valve 6. An intake air amount Gaircyl, an intake air temperature Ta, and an intake pressure PBA are detected by the above sensors 9, 10, and 11, and detection signals indicative thereof are delivered to the ECU 2.

Furthermore, fuel injection valves 12 are provided in the intake pipe 4 on a cylinder-by-cylinder basis. Each fuel injection valve 12 is connected to a fuel pump, not shown, and is electrically connected to the ECU 2. The injection amount and injection timing of fuel are controlled by a drive signal delivered from the ECU 2.

Between the intake pipe 4 and the exhaust pipe 5, there is disposed an EGR pipe 13 for recirculating part of exhaust gases discharged from the cylinder into the exhaust pipe 5 to the intake passage 4 side as external EGR gases. The EGR pipe 13 is connected to a portion of the intake passage 4 at a location downstream of the throttle valve 6. Further, an EGR control valve 14 for adjusting the flow rate of the external EGR gases is disposed in an intermediate portion of the EGR pipe 13. The opening degree of the EGR control valve 14 is controlled by a drive signal from the ECU 2, whereby an external EGR amount Gexegr of exhaust gases recirculated to the intake passage 4 side is controlled.

Spark plugs 15 are mounted through the cylinder head of the engine 1 on a cylinder-by-cylinder basis in a manner facing an associated combustion chamber. Each spark plug 15 is electrically connected to the ECU 2, and is ignited by a drive signal from the ECU 2, whereby ignition timing control is performed.

Further, the engine 1 is provided with an engine coolant temperature sensor 16 for detecting an engine coolant temperature TW, a crank angle sensor 17 for detecting a rotational angle of the crankshaft of the engine 1, an intake cam angle sensor 18 and an exhaust cam angle sensor 19 for detecting rotational angles of respective camshafts to which the intake cams and the exhaust cams are fixed. Detection signals from these sensors 16, 17, 18, and 19 are delivered to the ECU 2.

The crank angle sensor 17 delivers a CRK signal and a TDC signal, which are both pulse signals, to the ECU 2 along with rotation of the crankshaft. Each pulse of the CRK signal is delivered whenever the crankshaft rotates through a predetermined crank angle (e.g. 1°). The ECU 2 calculates a rotational speed of the engine 1 (hereinafter referred to as the "engine speed") NE based on the CRK signal. Further, the TDC signal indicates that a piston in each cylinder is in a predetermined crank angle position slightly before the top dead center position at the start of an intake stroke, and is delivered whenever the crankshaft rotates through 180° in the case where the engine 1 has four cylinders.

The intake cam angle sensor 18 delivers an intake cam signal, which is a pulse signal, to the ECU 2 along with rotation of the camshaft of the intake cam, whenever the camshaft rotates through a predetermined cam angle (e.g. 1°). The ECU 2 calculates an operation phase CAIN of the intake valve based on the intake cam signal and the above-mentioned CRK signal. On the other hand, the exhaust cam angle sensor 19 delivers an exhaust cam signal, which is a pulse signal, to the ECU 2 along with rotation of the camshaft of the exhaust cam, whenever the camshaft rotates through a predetermined cam angle (e.g. 1°). The ECU 2 calculates an operation phase CAEX of the exhaust valve based on the exhaust cam signal and the above-mentioned CRK signal.

Further, a knocking sensor 20 for detecting high-frequency vibration is mounted on the engine 1, and delivers a detection signal indicative of the detected high-frequency vibration to the ECU 2. Furthermore, an exhaust pressure sensor 21 for detecting an exhaust pressure Pex delivers a detection signal indicative of the detected exhaust pressure Pex to the ECU 2.

Figure 2:
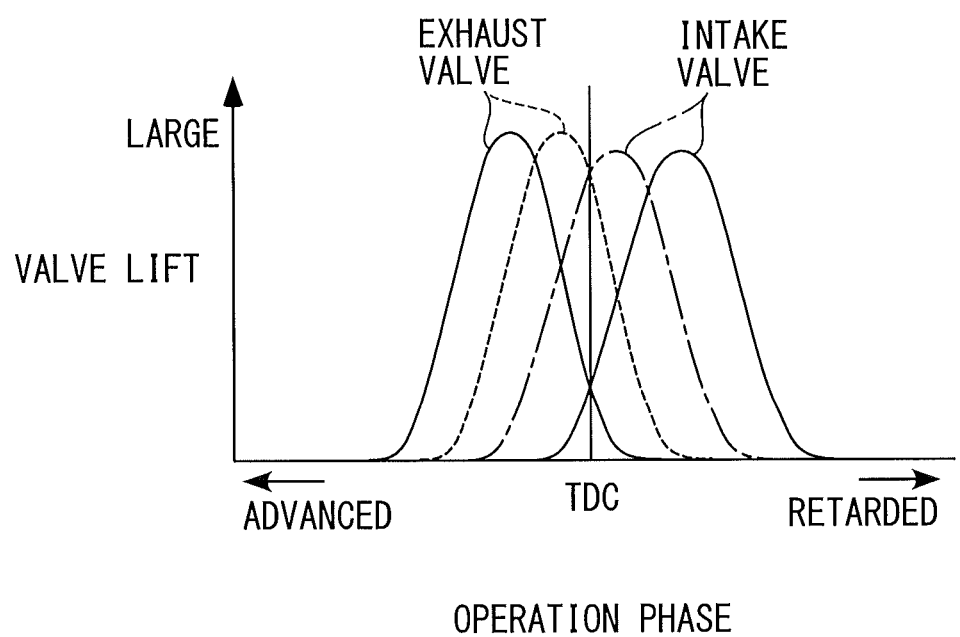
FIG. 2 Valve lift curves showing changes in valve timings of an intake valve and an exhaust valve.

The phase of the intake cam is changed by the variable intake cam phase mechanism of the valve operation characteristic variable device 3, whereby the operation phase CAIN of the intake valve is steplessly changed between a most retarded phase indicated by a solid line in FIG. 2 and a most advanced phase indicated by a one-dot chain line in FIG. 2. Further, although not shown, the lift amount of the intake valve is changed between the two stages of large and small amounts by the above-mentioned variable valve lift mechanism. On the other hand, the phase of the exhaust cam is changed by the variable exhaust cam phase mechanism of the valve operation characteristic variable device 3, whereby the operation phase CAEX of the exhaust valve is steplessly changed between a most advanced phase indicated by a solid line in FIG. 2 and a most retarded phase indicated by a broken line in FIG. 2.

Further, as shown in FIG. 2, in the vicinity of the top dead center position (TDC), overlap occurs in which the intake valve and the exhaust valve open at the same time. This causes part of exhaust gases discharged into the exhaust pipe 5 to flow back into the intake pipe 4 side. The exhaust gases having flowed back are drawn into the cylinder in the subsequent intake stroke to be recirculated, whereby an internal EGR amount is obtained. The internal EGR amount is controlled by changing the operation phases CAIN and CAEX of the intake valve and the exhaust valve. As the overlap is larger, i.e. as the operation phase CAIN of the intake valve is more advanced, and also the operation phase CAEX of the exhaust valve is more retarded, the internal EGR amount becomes larger, whereby a relatively larger amount of the internal EGR amount is obtained.

The ECU 2 is implemented by a microcomputer comprised of a CPU, a RAM, a ROM, and an I/O interface (none of which are shown). The ECU 2 performs calculation of the amount of in-cylinder gases actually filled in the cylinder, calculation of an EGR ratio, and ignition timing control, according to the detection signals from the above-mentioned various sensors, as described hereinafter. Note that in the present embodiment, the ECU 2 corresponds to reference in-cylinder gas amount-calculating means, ideal in-cylinder gas amount-calculating means, ideal in-cylinder gas temperature-calculating means, in-cylinder gas temperature-calculating means, in-cylinder gas amount-calculating means, EGR ratio-calculating means, internal EGR amount-calculating means, external EGR amount-calculating means, external EGR temperature-obtaining means, basic value-calculating means, EGR-dependent knocking correction amount-calculating means, temperature-dependent knocking correction amount-calculating means, knocking limit ignition timing-calculating means, ignition timing control means, and optimum ignition timing-calculating means.

Now, a description will be given, with reference to FIG. 3, of the outline of a method of calculating an in-cylinder gas amount Gact and an in-cylinder gas temperature Tcyl, which are the amount and the temperature of actual in-cylinder gases filled in the cylinder. The figure shows the relationship between the intake pressure PBA and an in-cylinder gas amount G when the engine speed NE is a predetermined fixed value, and further the operation phase CAIN of the intake valve and the operation phase CAEX of the exhaust valve are respective predetermined fixed values.

Figure 3:
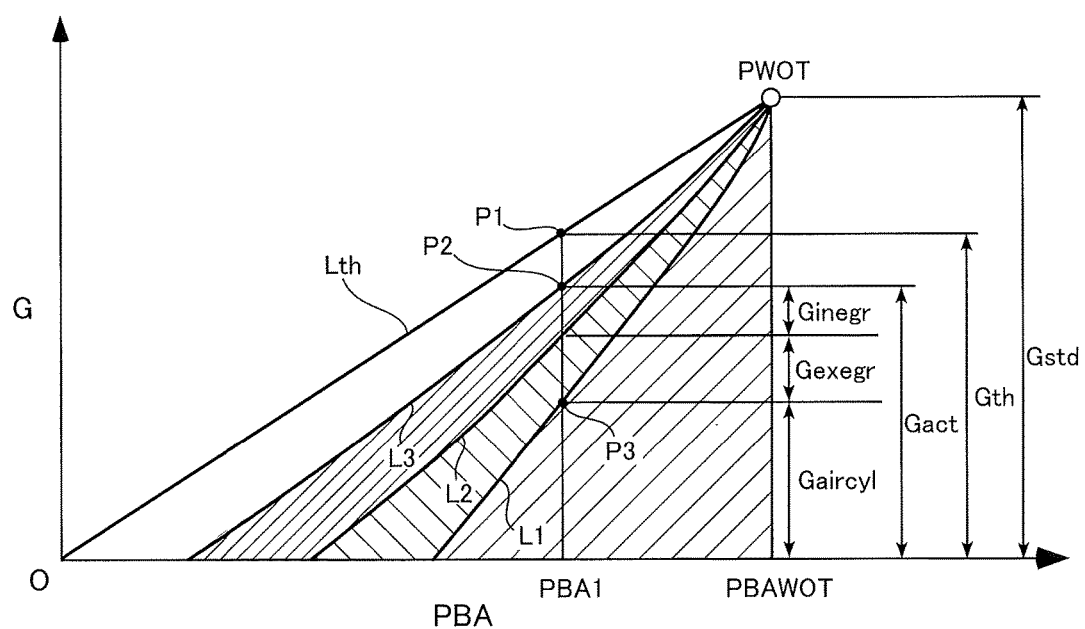
FIG. 3 A diagram useful in explaining the outline of a method of calculating an in-cylinder gas amount and an in-cylinder gas temperature.

A reference point PWOT shown in FIG. 3 corresponds to a state in which the throttle valve 6 is fully opened (reference state). At the reference point PWOT, the throttle valve 6 is in the fully-open state, so that the intake pressure PBA becomes equal to an intake pressure PBAWOT (reference intake pressure) approximately equal to the atmospheric pressure. Further, since there is almost no pressure difference between the exhaust side and the intake side, there occurs no back-flow of exhaust gases from the exhaust side into the intake side even in a state in which the overlap of the intake valve and the exhaust valve occurs, so that the internal EGR amount due to blow-back from the intake side becomes approximately equal to 0.

Further, a line Lth connecting the reference point PWOT and an origin O (hereinafter referred to as the "ideal line Lth") represents the relationship between the intake pressure and the in-cylinder gases in an ideal state in which it is assumed that no exhaust gases are recirculated into the cylinder, i.e. in an ideal state in which it is assumed that the external EGR is not performed and there is no internal EGR. That is, in the above-mentioned reference state and ideal state, the in-cylinder gas temperature and a gas constant of the in-cylinder gases can be regarded as constant, and hence the ideal line Lth is derived from the equation of state of gas as a straight line.

Further, in FIG. 3, lines L1, L2, and L3 represent the amounts of various gases of the actual in-cylinder gases. More specifically, the line L1 represents the intake air amount Gaircyl of the in-cylinder gases, the line L2 represents the sum of the intake air amount Gaircyl of the in-cylinder gases and the external EGR amount Gexegr, and the line L3 represents a total in-cylinder gas amount, i.e. the sum of the intake air amount Gaircyl, the external EGR amount Gexegr, and an internal EGR amount Ginegr. Note that differently from the above-described ideal line Lth as a straight line, actually, the above lines L1, L2, and L3 extend downward from the reference point PWOT in a slightly convexly curved manner, but they are represented by straight lines, for convenience.

Now, a description will be given of the relationship between states on the ideal line Lth and the lines L1, L2, and L3, obtained when the intake pressure PBA is equal to a predetermined intake pressure PBA1 smaller than a reference intake pressure PBAWOT at the reference point PWOT.

First, as to the relationship between a state P1 on the ideal line Lth and a state P2 on the line L3, there holds the following equation (1) from the equation of state of gas.

[Math 1]

$$Gth \times Tcylth = Gact \times Tcyl \quad (1)$$

Gth: In-cylinder gas amount in the state P1 (ideal in-cylinder gas amount)

Tcylth: In-cylinder gas temperature in the state P1 (ideal in-cylinder gas temperature)

Gact: In-cylinder gas amount in the state P2 (actual in-cylinder gas amount)

Tcyl: In-cylinder gas temperature in the state P2 (actual in-cylinder gas temperature)

Further, in the state P2 on the line L3, i.e. in an actual state in which exhaust gases due to the internal EGR and the external EGR are recirculated into the cylinder together with intake air, there holds the following equation (2) from an equilibrium relationship in temperature in the cylinder.

[Math 2]

$$Gact \times Tcyl = Ta \times Gaircyl + Tex \times Ginegr + Tegr \times Gexegr \quad (2)$$

Ta: Intake air temperature
Gaircyl: Intake air amount
Tex: Exhaust gas temperature
Ginegr: Internal EGR amount
Tegr: External EGR gas temperature
Gexegr: External EGR amount When the above-mentioned simultaneous equations (1) and (2) are solved, the in-cylinder gas amount Gact and the in-cylinder gas temperature Tcyl, which are the amount and the temperature of in-cylinder gases actually filled in the cylinder, are calculated as flows: First, the internal EGR amount Ginegr is represented by the following equation (3):

[Math 3]

$$Ginegr = \frac{Tcylth \times Gth - Ta \times Gaircyl - Tegr \times Gexegr}{Tex}$$
$$= \frac{Tcylstd \times Gth - Ta \times Gaircyl - Tegr \times Gexegr}{Tex} \quad (3)$$

Note that although in the equation (3), Tcylth in the upper line represents the ideal in-cylinder gas temperature as an in-cylinder gas temperature on the ideal line Lth, the ideal in-cylinder gas temperature is constant on the ideal line Lth, as described above, so that in the lower line of the equation (3), the ideal in-cylinder gas temperature Tcylth is replaced by a reference in-cylinder gas temperature Tcylstd as an in-cylinder gas temperature at the reference point PWOT.

Further, the above-mentioned reference in-cylinder gas temperature Tcylstd, and a reference in-cylinder gas amount Gstd as an in-cylinder gas amount at the reference point PWOT are calculated as follows: At the time of termination of an exhaust stroke of the engine, in a state in which the piston has reached the top dead center position, part of burned gases remain in a combustion chamber formed between the piston and the cylinder head without being discharged from the cylinder. The remaining burned gases exist within the cylinder together with the amount of intake air filled in the cylinder even in the reference state in which the throttle valve is fully opened and the internal EGR amount and the like are approximately equal to 0. The above-mentioned remaining burned gas amount Gegrd is expressed using the equation of state of gas by the following equation (4):

[Math 4]

$$Gegrd = \frac{Pex \times Vd}{R \times Tex} \quad (4)$$

Pex: Exhaust pressure
Vd: Volume of the combustion chamber in the cylinder obtained when the piston has reached the top dead center position
R: Gas constant
Tex: Exhaust gas temperature When the remaining burned gas amount Gegrd calculated by the above equation (4) is used, as to the reference in-cylinder gas temperature Tcylstd, there holds the following equation (5) from an equilibrium relationship in temperature in the cylinder in the reference state.

[Math 5]

$$Tcylstd = \frac{Ta \times Gaircyl + Tex \times Gegrd}{Gaircyl + Gegrd} \quad (5)$$

Ta: Intake air temperature
Gaircyl: Intake air amount
Tex: Exhaust gas temperature Further, the reference in-cylinder gas amount Gstd is the sum of the intake air amount Gaircyl and the remaining burned gas amount Gegrd, and there holds the following equation (6):

[Math 6]

$$Gstd = Gaircyl + Gegrd \quad (6)$$

Therefore, from the relationship between the reference point PWOT and the state P1 on the ideal line Lth, an ideal in-cylinder gas amount Gth in the state P1 is calculated using the intake pressure PBAWOT at the reference point PWOT, the intake pressure PBA1 in the state P1, and the reference in-cylinder gas amount Gstd, by the following equation (7):

[Math 7]

$$Gth = \frac{PBA1}{PBAWOT} \times Gstd \quad (7)$$

The reference in-cylinder gas temperature Tcylstd and the ideal in-cylinder gas amount Gth calculated as above are applied to the above-mentioned equation (3), whereby the internal EGR amount Ginegr is obtained.

Further, the in-cylinder gas temperature in the state P2 in FIG. 3, i.e. the actual in-cylinder gas temperature Tcyl is calculated from the equilibrium relationship in temperature in the cylinder, of the intake air, the internal EGR gases, and the external EGR gases, using the calculated internal EGR amount Ginegr etc., by the following equation (8):

[Math 8]

$$Tcyl = \frac{Ta \times Gaircyl + Tex \times Ginegr + Tegr \times Gexegr}{Gaircyl + Ginegr + Gexegr} \quad (8)$$

Then, in the above-mentioned equation (1), the ideal in-cylinder gas temperature Tcylth is replaced by the reference in-cylinder gas temperature Tcylstd, and Gth, Tcylstd, and Tcyl calculated by the above-mentioned equations (7), (5), and (8), respectively, are applied to the following equation (9) expressing the in-cylinder gas amount Gact, whereby Gact is calculated.

[Math 9]

$$Gact = Gth \times \frac{Tcylstd}{Tcyl} \quad (9)$$

Note that when the external EGR is not performed, the internal EGR amount Ginegr and the in-cylinder gas temperature Tcyl are calculated by setting Gexegr on the right side of the equations (3) and (8) to 0.

Figure 5:
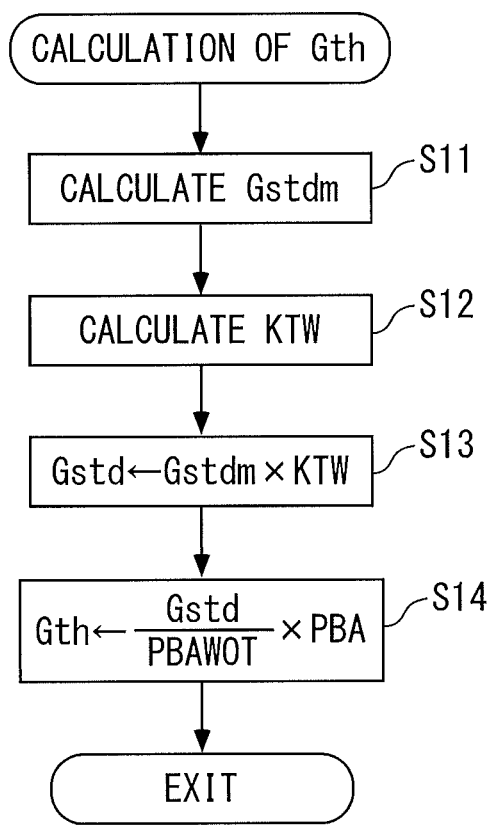
FIG. 5 A flowchart of a process for calculating an ideal in-cylinder gas amount Gth.
Figure 6:
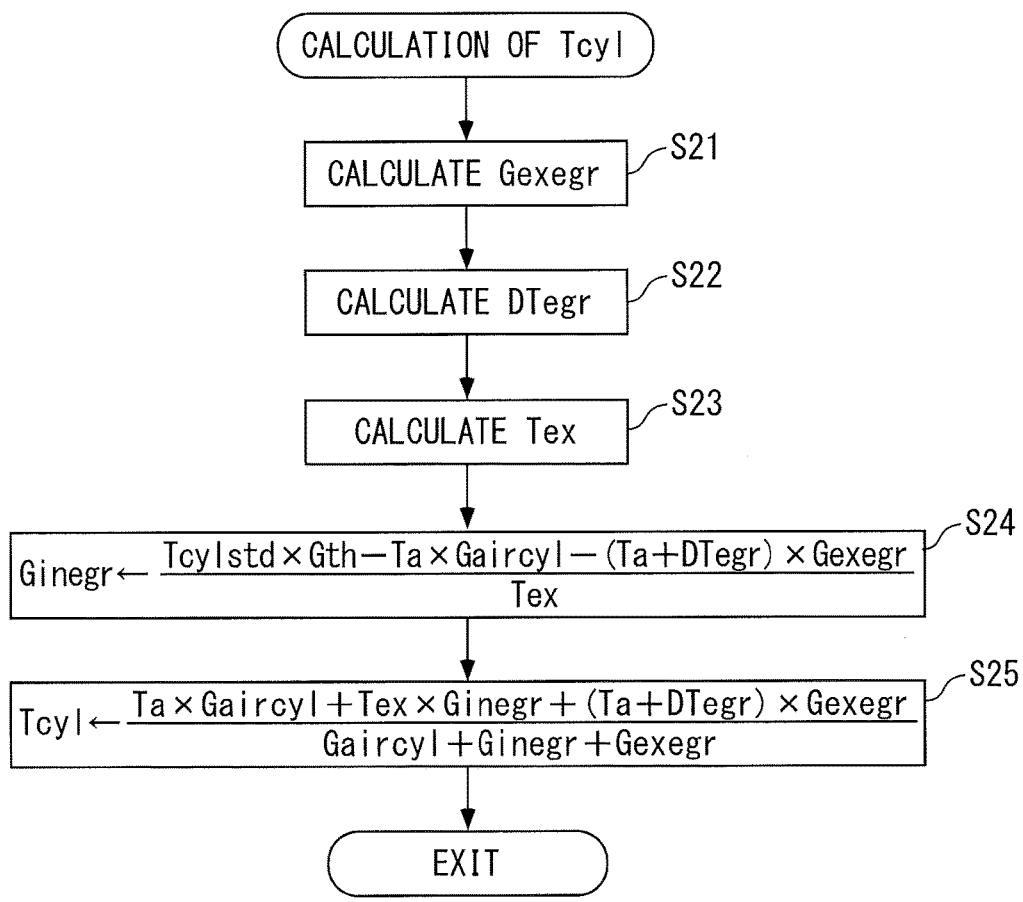
FIG. 6 A flowchart of a process for calculating an in-cylinder gas amount Tcyl.
Figure 7:
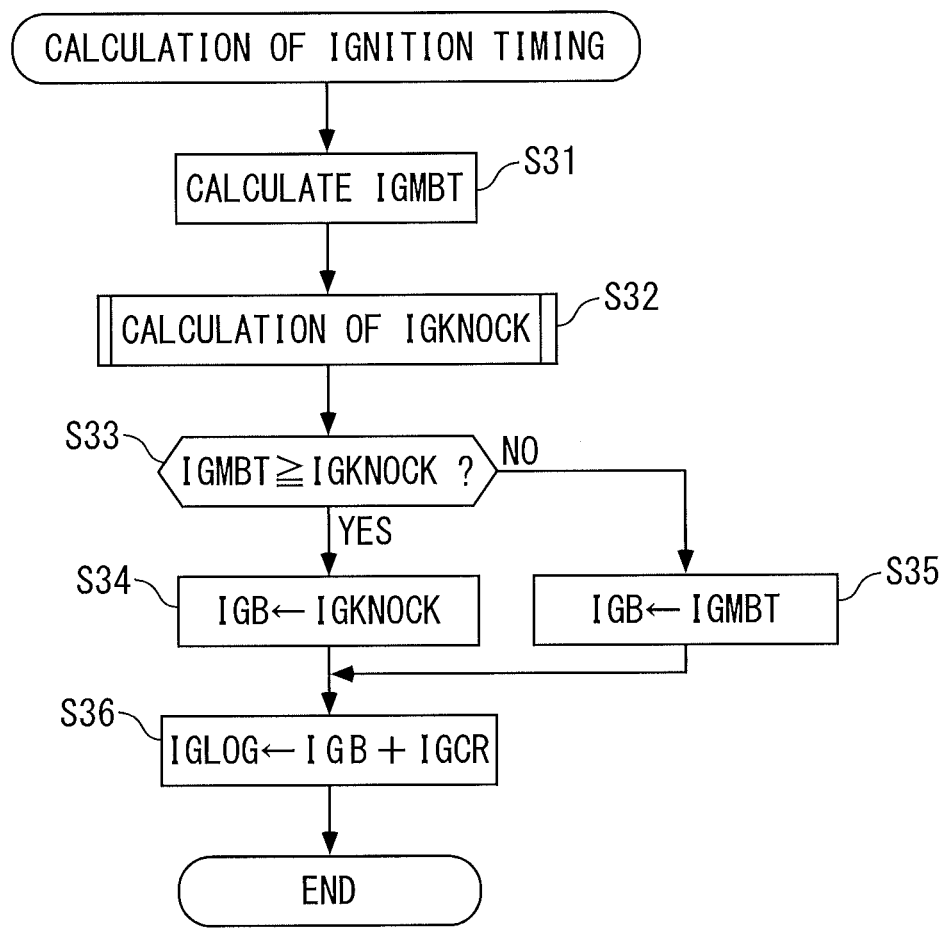
FIG. 7 A flowchart of a process for calculating an ignition timing IGLOG.

Next, with reference to FIGS. 4 to 6, a description will be given of a process, executed by the ECU 2, for calculating the EGR ratio, which is a ratio of the internal EGR amount and the external EGR amount to the in-cylinder gas amount formed by the intake air amount and the internal and external EGR amounts. The present process is performed in synchronism with generation of the TDC signal.

Figure 4:
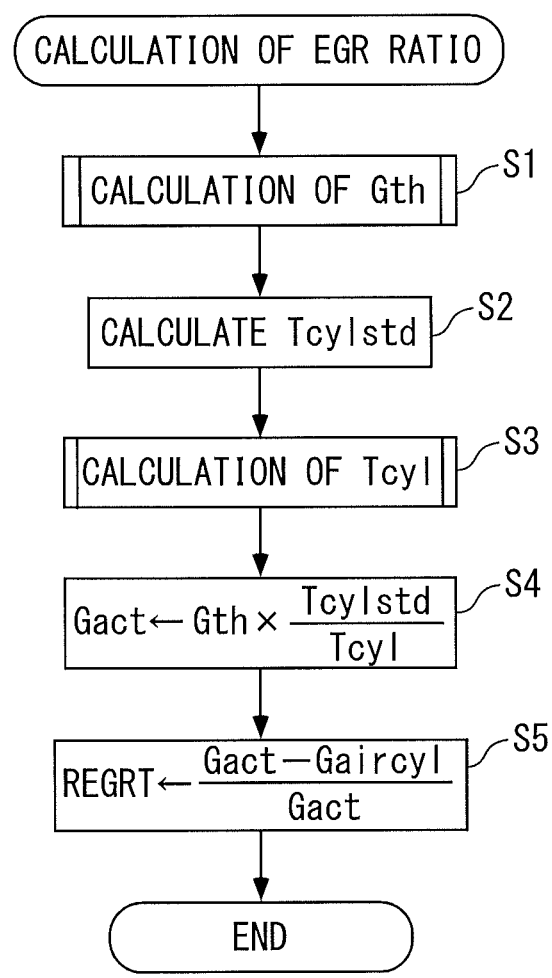
FIG. 4 A flowchart of a process for calculating an EGR ratio REGRT.

As shown in FIG. 4, in the process for calculating the EGR ratio, first, in a step 1 (shown as S1; similarly shown hereafter), the ideal in-cylinder gas amount Gth is calculated. FIG. 5 shows a process for calculating the ideal in-cylinder gas amount Gth. In the present process, first, in a step 11, a map value Gstdm is calculated by searching a reference in-cylinder gas amount map, not shown, according to the large or small lift amount of the intake valve, set by the above-mentioned variable valve lift mechanism, the engine speed NE, the operation phase CAIN of the intake valve, and the operation phase CAEX of the exhaust valve.

The above-mentioned reference in-cylinder gas amount map is formed by setting the relationship between the large or small lift amount of the intake valve, the engine speed NE, the operation phase CAIN of the intake valve, and the operation phase CAEX of the exhaust valve, and the reference in-cylinder gas amount Gstd, in the reference state in which the throttle valve 6 is fully open, based on measured data of an experiment performed in advance, and all the elements (capacities of each cylinder, each combustion chamber, and a portion of the intake pipe downstream of the throttle valve, and so forth) of the engine 1, and storing the relationship as map values Gstdm.

Then, a temperature-dependent correction coefficient KTW is calculated by searching a temperature-dependent correction coefficient map, not shown, according to the engine coolant temperature TW (step 12). Next, the map value Gstdm is subjected to temperature-dependent correction by multiplying the map value Gstdm calculated in the step 11 by the temperature-dependent correction coefficient KTW, whereby the reference in-cylinder gas amount Gstd is calculated (step 13).

Then, in a step 14, the ideal in-cylinder gas amount Gth is calculated using the reference in-cylinder gas amount Gstd and the reference intake pressure PBAWOT, by multiplying Gstd/PBAWOT corresponding to the slope of the above-described ideal line Lth by the detected intake pressure PBA.

Referring again to FIG. 4, in a step 2 following the step 1, the reference in-cylinder gas temperature Tcylstd is calculated by searching a reference in-cylinder gas temperature map, not shown, according to the large or small lift amount of the intake valve, the engine speed NE, the operation phase CAIN of the intake valve, and the operation phase CAEX of the exhaust valve. The above-mentioned reference in-cylinder gas temperature map is formed by setting the relationship between the large or small lift amount of the intake valve, the engine speed NE, the operation phase CAIN of the intake valve, and the operation phase CAEX of the exhaust valve, and the reference in-cylinder gas temperature Tcylstd, based on measured data of an experiment performed in advance and the elements of the engine 1, and storing the relationship.

Then, the in-cylinder gas temperature Tcyl is calculated (step 3). FIG. 6 shows a process for calculating the in-cylinder gas temperature Tcyl. In the present process, first, in a step 21, the external EGR amount Gexegr is calculated. The external EGR amount Gexegr is calculated by applying e.g. the opening degree of the EGR control valve 14, pressure on the upstream side of the EGR control valve 14 (e.g. the exhaust pressure Pex), and pressure on the downstream side thereof (e.g. the intake pressure PBA), to the equation of the nozzle.

Then, a temperature rise amount DTegr, which is the amount of rise of temperature due to execution of the external EGR, is calculated by searching a temperature rise amount map, not shown, according to the external EGR amount Gexegr calculated in the step 21 and the engine speed NE (step 22). In the temperature rise amount map, the temperature rise amount DTegr is set such that it becomes larger as the external EGR amount Gexegr is larger and as the engine speed NE is higher.

Then, the exhaust gas temperature Tex is calculated by searching an exhaust gas temperature map, not shown, according to the intake air amount Gaircyl and the engine speed NE (step 23). In the exhaust gas temperature map, the exhaust gas temperature Tex is set such that it becomes higher as the intake air amount Gaircyl is larger and as the engine speed NE is higher.

Then, the internal EGR amount Ginegr is calculated by applying the ideal in-cylinder gas amount Gth calculated in the step 1, the reference in-cylinder gas temperature Tcylstd calculated in the step 2, the detected intake air temperature Ta and intake air amount Gaircyl, and the external EGR amount Gexegr, the temperature rise amount DTegr, and the exhaust gas temperature Tex calculated in the steps 21, 22 and 23, to the following equation (10) corresponding to the above-mentioned equation (3) (step 24).

[Math 10]

$$Ginegr = \frac{Tcylstd \times Gth - Ta \times Gaircyl - (Ta + DTegr) \times Gexegr}{Tex} \quad (10)$$

Next, the in-cylinder gas temperature Tcyl is calculated by applying the intake air temperature Ta, the intake air amount Gaircyl, and the calculated external EGR amount Gexegr, temperature rise amount DTegr, exhaust gas temperature Tex, and internal EGR amount Ginegr, to the following equation (11) corresponding to the above-mentioned equation (8) (step 25), followed by terminating the present process.

[Math 11]

$$Tcyl = \frac{Ta \times Gaircyl + Tex \times Ginegr + (Ta + DTegr) \times Gexegr}{Gaircyl + Ginegr + Gexegr} \quad (11)$$

Referring again to FIG. 4, in a step 4 following the step 3, the in-cylinder gas amount Gact is calculated by applying the ideal in-cylinder gas amount Gth, the reference in-cylinder gas temperature Tcylstd, and the in-cylinder gas temperature Tcyl, calculated in the steps 1, 2, and 3, respectively, to the above-mentioned equation (9) (step 4).

Then, in a step 5, an EGR ratio REGRT is calculated by applying the in-cylinder gas amount Gact calculated in the step 4 and the intake air amount Gaircyl, to the following equation (12), followed by terminating the present process.

[Math 12]

$$REGRT = \frac{Gact - Gaircyl}{Gact} \quad (12)$$

Next, a process for calculating the ignition timing, executed by the ECU 2, will be described with reference to FIGS. 7 to 13. The ignition timing is represented by the amount of advance from the compression top dead center. The present process is performed in synchronism with generation of the TDC signal.

Figure 10:
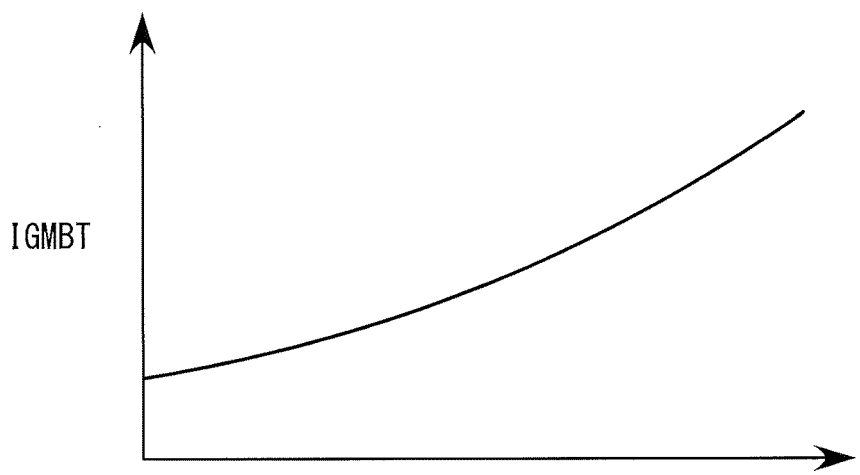
FIG. 10 A map showing a relationship between the EGR ratio REGRT and an optimum ignition timing IGMBT.

In the present process, first, in a step 31, an optimum ignition timing IGMBT at which the output torque of the engine 1 becomes maximum is calculated by searching an IGMBT map shown in FIG. 10 according to the engine speed NE and the EGR ratio REGRT calculated as described above. In the IGMBT map, the optimum ignition timing IGMBT is set such that it becomes larger (more advanced) as the EGR ratio REGRT is larger. Note that it is confirmed that the relationship between the EGR ratio REGRT and the optimum ignition timing IGMBT can be represented by the IGMBT map shown in FIG. 10, irrespective of the operation phase CAIN of the intake valve, the operation phase CAEX of the exhaust valve, or whether or not the external EGR is executed.

Figure 8:
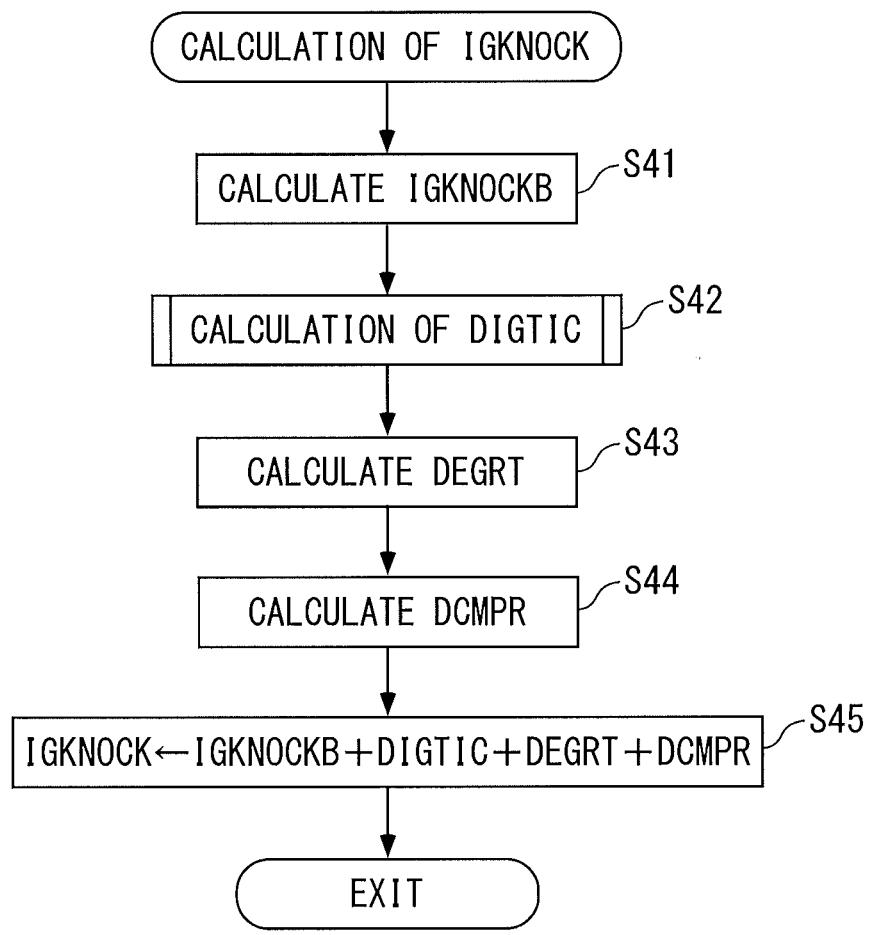
FIG. 8 A flowchart of a process for calculating a knocking limit ignition timing IGKNOCK.

Then, a knocking limit ignition timing IGKNOCK corresponding to a limit beyond which knocking occurs in the engine 1 is calculated (step 32). FIG. 8 shows a subroutine for a process for calculating the knocking limit ignition timing IGKNOCK. As shown in the figure, in the present process, first, in a step 41, a basic value IGKNOCKB of the knocking limit ignition timing IGKNOCK is calculated by searching an IGKNOCKB map, not shown, according to the engine speed NE and the intake air amount Gaircyl. The above-mentioned IGKNOCKB map is set in a manner associated with a state in which the EGR ratio REGRT is set to a predetermined reference value, and also the operation phase CAIN of the intake valve and the operation phase CAEX of the exhaust valve are set to reference phases (e.g. the most retarded phase and the most advanced phase), respectively.

Then, in a step 42, a temperature-dependent knocking correction amount DIGTIC is calculated. FIG. 9 shows a subroutine for a process for calculating the temperature-dependent knocking correction amount DIGTIC. As shown in the figure, in the present process, first, in a step 51, a reference in-cylinder gas temperature TICKNBS is calculated. The reference in-cylinder gas temperature TICKNBS is calculated by searching the reference in-cylinder gas temperature map used for calculation of the reference in-cylinder gas temperature Tcylstd in the step 2, according to the large or small lift amount of the intake valve, the engine speed NE, and the above-mentioned reference phases of the intake valve and the exhaust valve.

Figure 11:
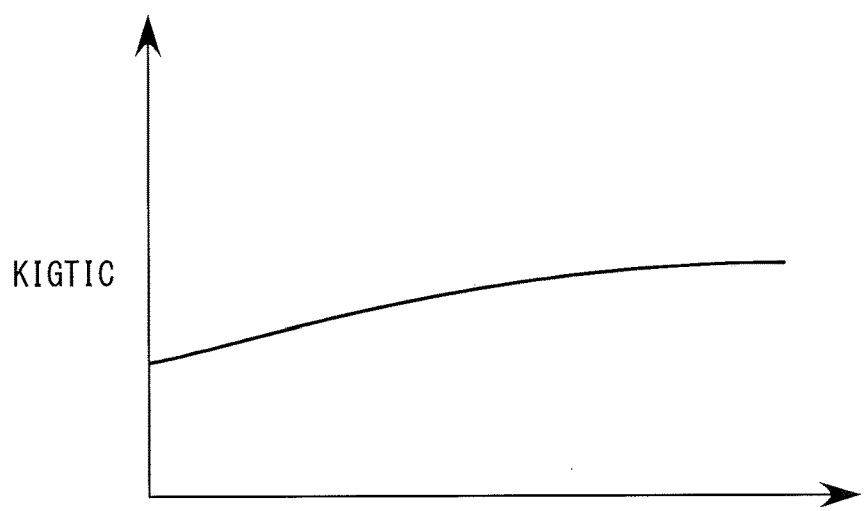
FIG. 11 A map showing a relationship between an engine speed NE and a correction coefficient KIGTIC.

Then, a correction coefficient KIGTIC is calculated by searching a KIGTIC map shown in FIG. 11 according to the large or small lift amount of the intake valve and the engine speed NE (step 52). In the KIGTIC map, the correction coefficient KIGTIC is set such that it progressively becomes larger as the engine speed NE becomes higher.

Then, the temperature-dependent knocking correction amount DIGTIC is calculated by applying the reference in-cylinder gas temperature TICKNBS and the correction coefficient KIGTIC calculated in the steps 51 and 52, respectively, and the in-cylinder gas temperature Tcyl calculated in the step 3, to the following equation (13), followed by terminating the present process (step 53).

[Math 13]

$$DIGTIC = (TICKNBS - Tcyl) \times KIGTIC \quad (13)$$

As is apparent from the above calculation method, the temperature-dependent knocking correction amount DIGTIC is set such that it becomes smaller, i.e. it makes the ignition timing more retarded, as the in-cylinder gas temperature Tcyl is higher than the reference in-cylinder gas temperature TICKNBS.

Figure 12:
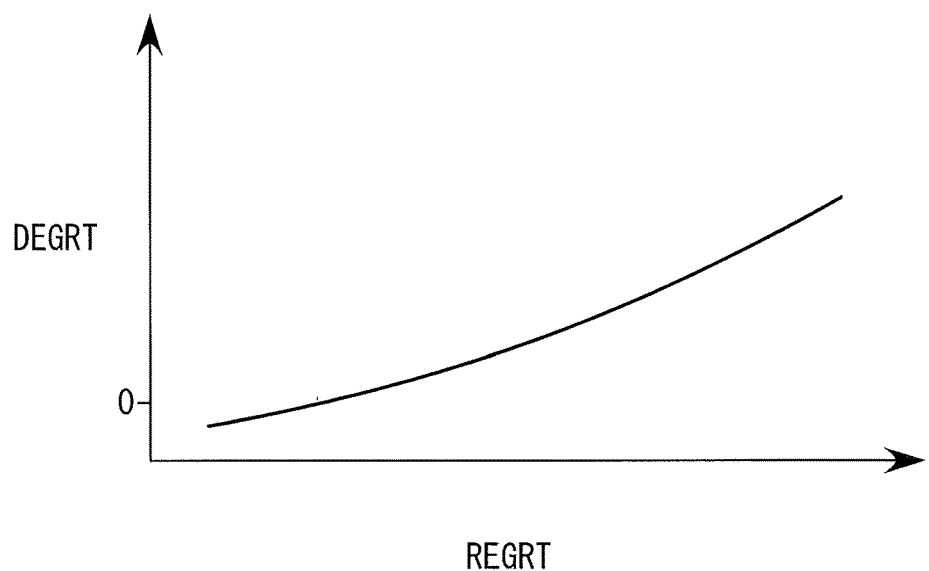
FIG. 12 A map showing a relationship between the EGR ratio REGRT and an EGR-dependent knocking correction amount DEGRT.

Referring again to FIG. 8, in a step 43 following the step 42, an EGR-dependent knocking correction amount DEGRT is calculated by searching a DEGRT map shown in FIG. 12 according to the EGR ratio REGRT and the engine speed NE. In the DEGRT map, the EGR-dependent knocking correction amount DEGRT is set such that it becomes larger, i.e. it makes the ignition timing more retarded, as the EGR ratio REGRT is larger.

Figure 13:
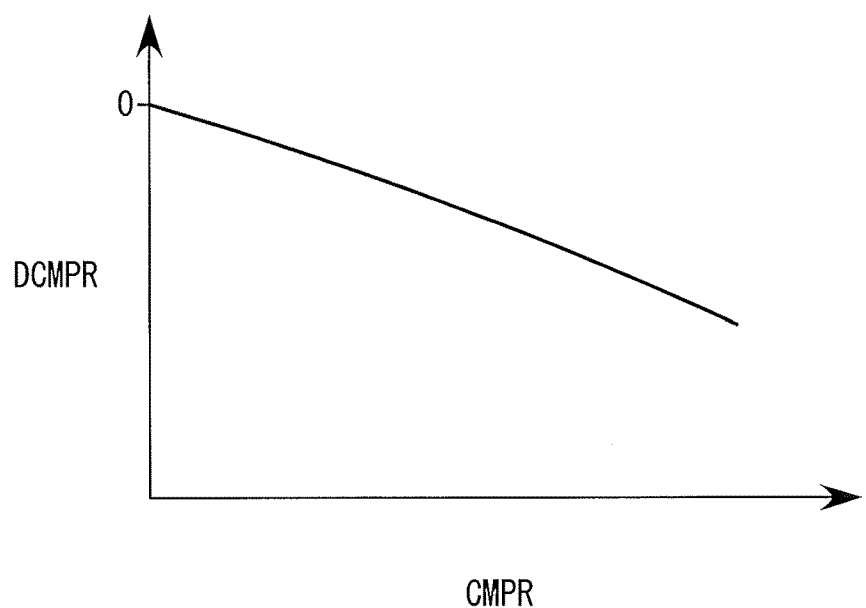
FIG. 13 A map showing a relationship between an effective compression ratio CMPR and a compression ratio-dependent knocking correction amount DCMPR.

Then, in a step 44, a compression ratio-dependent knocking correction amount DCMPR is calculated. To calculate the compression ratio-dependent knocking correction amount DCMPR, first, an effective compression ratio CMPR is calculated by searching a CMPR table, not shown, according to the operation phases CAIN and CAEX of the intake valve and the exhaust valve. Note that in the above-mentioned CMPR table, the effective compression ratio CMPR is set such that it becomes larger as the amount of advance of the operation phase CAIN of the intake valve becomes larger and as the amount of retardation of the operation phase CAEX of the exhaust valve becomes larger. Then, the compression ratio-dependent knocking correction amount DCMPR is calculated by searching a DCMPR map shown in FIG. 13 according to the calculated effective compression ratio CMPR and the engine speed NE. As shown in FIG. 13, in the DCMPR map, the compression ratio-dependent knocking correction amount DCMPR takes a value not larger than 0, and is set such that it becomes smaller, i.e. it makes the ignition timing more retarded as the effective compression ratio CMPR increases.

Then, in a step 45, the knocking limit ignition timing IGKNOCK is calculated by applying the basic value IGKNOCKB, the temperature-dependent knocking correction amount DIGTIC, the EGR-dependent knocking correction amount DEGRT, and the compression ratio-dependent knocking correction amount DCMPR calculated in the steps 41 to 44, respectively, to the following equation (14), followed by terminating the present process.

[Math 14]

$$IGKNOCK=IGKNOCKB+DIGTIC+DEGRT+DCMPR \quad (14)$$

Referring again to FIG. 7, in a step 33 following the step 32, it is determined whether or not the optimum ignition timing IGMBT is not smaller than the knocking limit ignition timing IGKNOCK. If the answer to this question is affirmative (YES), i.e. if the optimum ignition timing IGMBT is calculated to be equal to or more advanced than the knocking limit ignition timing IGKNOCK, to avoid occurrence of knocking, a basic ignition timing IGB is set to the knocking limit ignition timing (step 34). On the other hand, if the answer to the question of the step 33 is negative (NO), i.e. if the optimum ignition timing IGMBT is calculated to be more retarded than the knocking limit ignition timing IGKNOCK, to obtain the maximum output of the engine 1 while avoiding occurrence of knocking, the basic ignition timing IGB is set to the optimum ignition timing IGMBT (step 35).

Then, an ignition timing IGLOG is calculated by adding a correction value IGCR calculated according to e.g. the engine coolant temperature TW, to the basic ignition timing IGB set in the step 34 or 35 (step 36), followed by terminating the present process. Ignition by the spark plug 15 is performed based on the ignition timing IGLOG calculated as above.

Figure 14:
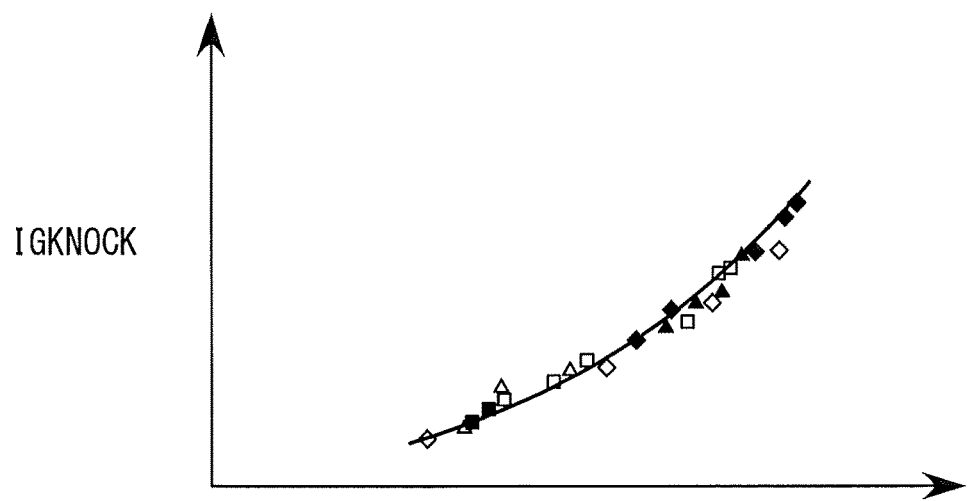
FIG. 14 A map showing a relationship between the EGR ratio REGRT and the knocking limit ignition timing IGKNOCK.

FIG. 14 shows the relationship between the EGR ratio REGRT and the knocking limit ignition timing IGKNOCK. More specifically, FIG. 14 shows the knocking limit ignition timing IGKNOCK, which is plotted in relation to the EGR ratio REGRT, by setting the operation phases CAIN and CAEX of the intake valve and the exhaust valve to six pairs of operation phases different from each other, respectively, and correcting the knocking limit ignition timing IGKNOCK using the in-cylinder gas temperature Tcyl. As is apparent from the figure, it is confirmed that the knocking limit ignition timing IGKNOCK, which has been corrected using the in-cylinder gas temperature Tcyl, has a high correlation with the EGR ratio REGRT, irrespective of the operation phases CAIN and CAEX of the intake valve and the exhaust valve or whether or not the external EGR is executed.

Figure 15:
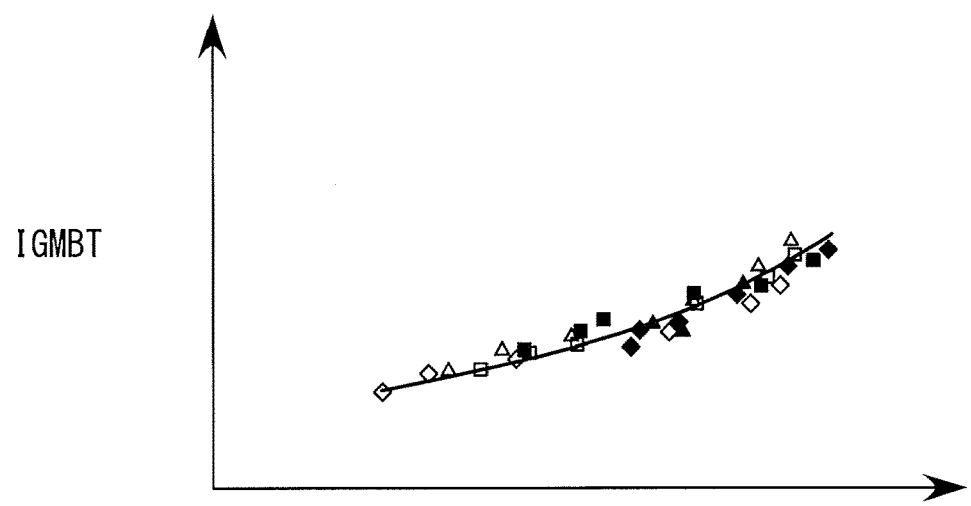
FIG. 15 A map showing a relationship between the EGR ratio REGRT and an optimum ignition timing IGMBT.

FIG. 15 shows the relationship between the EGR ratio REGRT and the optimum ignition timing IGMBT. More specifically, FIG. 15 shows the optimum ignition timing IGMBT, which is plotted in relation to the EGR ratio REGRT, by setting the operation phases CAIN and CAEX of the intake valve and the exhaust valve, similar to FIG. 14, and correcting the optimum ignition timing IGMBT using the in-cylinder gas temperature Tcyl. As is apparent from the figure, it is confirmed that, similar to the above-described knocking limit ignition timing IGKNOCK, the optimum ignition timing IGMBT, which has been corrected using the in-cylinder gas temperature Tcyl, also has a high correlation with the EGR ratio REGRT irrespective of the operation phases CAIN and CAEX of the intake valve and the exhaust valve or whether or not the external EGR has been executed.

As described in detail heretofore, according to the present embodiment, even in a case where the in-cylinder gas temperature Tcyl is changed by execution of the internal EGR and the external EGR, it is possible to accurately calculate the in-cylinder gas amount Gact and the EGR ratio REGRT by a relatively simple method. Further, the knocking limit ignition timing IGKNOCK and the optimum ignition timing IGMBT can be properly calculated using the EGR ratio REGRT thus calculated, and the ignition timing IGLOG can be properly controlled using them.

Note that the present invention is by no means limited to the above-described embodiment, but can be practiced in various forms. For example, although in the embodiment, the description is given of the case where the ignition timing IGLOG is controlled using the EGR ratio REGRT, the present invention is not limited to this, but can also be applied to any other control of another engine 1.

Further, although the embodiment is an example in which the present invention is applied to a gasoline engine for a vehicle, it can be applied to a diesel engine. Further, the present invention can be applied to engines for other uses, e.g. engines for ship propulsion machines, such as an outboard engine having a vertically-disposed crankshaft. It is to be understood that various changes and modifications may be made without departing from the spirit and scope thereof.

REFERENCE SIGNS LIST

1 internal combustion engine
2 ECU (reference in-cylinder gas amount-calculating means, ideal in-cylinder gas amount-calculating means, ideal in-cylinder gas temperature-calculating means, in-cylinder gas temperature-calculating means, in-cylinder gas amount-calculating means, EGR ratio-calculating means, internal EGR amount-calculating means, external EGR amount-calculating means, external EGR temperature-obtaining means, basic value-calculating means, EGR-dependent knocking correction amount-calculating means, temperature-dependent knocking correction amount-calculating means, knocking limit ignition timing-calculating means, ignition timing control means, optimum ignition timing-calculating means)
3 valve operation characteristic variable device (variable intake and exhaust valve operation phase mechanism)
4 intake pipe (intake passage)
5 exhaust pipe (exhaust passage)
6 throttle valve
9 intake air amount sensor (intake air amount-obtaining means)
10 intake air temperature sensor (intake air temperature-detecting means)
11 intake pressure sensor (intake pressure-detecting means)
13 EGR pipe (EGR device)
14 EGR control valve (EGR device)
16 engine coolant temperature sensor
17 crank angle sensor (rotational speed-detecting means)
18 intake cam angle sensor (operation phase-obtaining means)
19 exhaust cam angle sensor (operation phase-obtaining means)
Gaircyl intake air amount
Ta intake air temperature PBA intake pressure
TW engine coolant temperature
NE engine speed
CAIN operation phase of intake valve
CAEX operation phase of exhaust valve
Gact in-cylinder gas amount
Tcyl in-cylinder gas temperature
Gth ideal in-cylinder gas amount
Tcylth ideal in-cylinder gas temperature
Gstd reference in-cylinder gas amount
Tcylstd reference in-cylinder gas temperature
Ta intake air temperature
Tex exhaust gas temperature
Ginegr internal EGR amount
Tegr external EGR gas temperature
Gexegr external EGR amount
REGRT EGR ratio
PBAWOT intake pressure in reference state
DTegr temperature rise amount due to external EGR
IGMBT optimum ignition timing
IGKNOCK knocking limit ignition timing
IGKNOCKB basic value of knocking limit ignition timing
DIGTIC temperature-dependent knocking correction amount
DEGRT EGR-dependent knocking correction amount

The invention claimed is:

1. A control system for an internal combustion engine that draws air into a cylinder via a throttle valve provided in an intake passage, and performs internal EGR for recirculating exhaust gases of the engine, which have been caused to flow back from an exhaust passage into the intake passage by overlap of an intake valve and an exhaust valve, into the cylinder, the control system comprising:
 rotational speed-detecting means for detecting a rotational speed of the engine;
 intake pressure-detecting means for detecting an intake pressure in the engine;
 reference in-cylinder gas amount-calculating means for calculating a reference in-cylinder gas amount, which is an amount of gases filled in the cylinder in a reference state in which the throttle valve is fully open, according to the rotational speed of the engine;
 ideal in-cylinder gas amount-calculating means for calculating an ideal in-cylinder gas amount, which is an amount of gases filled in the cylinder in an ideal state in which it is assumed that no exhaust gases of the engine are recirculated into the cylinder, according to the reference in-cylinder gas amount and the intake pressure;
 ideal in-cylinder gas temperature-calculating means for calculating a temperature of in-cylinder gases in the ideal state;
 in-cylinder gas temperature-calculating means for calculating a temperature of actual in-cylinder gases filled in the cylinder;
 in-cylinder gas amount-calculating means for calculating an in-cylinder gas amount, which is an amount of in-cylinder gases actually filled in the cylinder, by correcting the ideal in-cylinder gas amount using the ideal in-cylinder gas temperature according to the in-cylinder gas temperature;
 intake air amount-obtaining means for obtaining an intake air amount actually drawn into the cylinder; and
 EGR ratio-calculating means for calculating an EGR ratio, which is a ratio of an EGR amount to the in-cylinder gas amount, using the in-cylinder gas amount and the intake air amount.

2. The control system according to claim 1, further comprising:
 intake air temperature-detecting means for detecting a temperature of air drawn into the cylinder as an intake air temperature;
 exhaust gas temperature-obtaining means for detecting or estimating a temperature of exhaust gases of the engine and obtaining the temperature of the exhaust gases as an exhaust gas temperature; and
 internal EGR amount-calculating means for calculating an internal EGR amount using the ideal in-cylinder gas temperature, the ideal in-cylinder gas amount, the intake air temperature, the intake air amount, and the exhaust gas temperature, and
 wherein said in-cylinder gas temperature-calculating means calculates the in-cylinder gas temperature based on the intake air amount, the intake air temperature, the internal EGR amount, and the exhaust gas temperature.

3. The control system according to claim 2, wherein the engine includes a variable intake and exhaust valve operation phase mechanism for changing the internal EGR amount by changing operation phases of the intake valve and the exhaust valve, and
 wherein relationships between the rotational speed of the engine and the operation phases of the intake valve and the exhaust valve, and the reference in-cylinder gas amount and a reference in-cylinder gas temperature, which is a temperature of in-cylinder gases in the reference state, are set and stored, based on measured data of an experiment performed in advance, and elements of the engine,
 the control system further comprising operation phase-obtaining means for obtaining the operation phases of the intake valve and the exhaust valve, and
 wherein said reference in-cylinder gas amount-calculating means calculates the reference in-cylinder gas amount, and said ideal in-cylinder gas temperature-calculating means calculates the reference in-cylinder gas temperature as the ideal in-cylinder gas temperature, based on the stored relationships, according to the detected rotational speed of the engine and the obtained operation phases of the intake valve and the exhaust valve.

4. The control system according to claim 3, wherein the reference in-cylinder gas amount is set as the sum of the intake air amount in the reference state and a remaining burned gas amount of remaining burned gases remaining in the cylinder in a state in which a piston of the cylinder is in a top dead center position.

5. The control system according to claim 2, wherein the engine further includes an external EGR device that performs external EGR for recirculating exhaust gases discharged from the cylinder into the exhaust passage, into the intake passage via an EGR passage,
 the control system further comprising:
 external EGR amount-calculating means for calculating an external EGR amount; and
 external EGR temperature-obtaining means for detecting or estimating an external EGR temperature, and
 wherein said in-cylinder gas temperature-calculating means calculates the in-cylinder gas temperature, further using the external EGR amount and the external EGR temperature.

6. The control system according to claim 1, further comprising ignition timing control means for controlling an ignition timing of the engine using a knocking limit ignition timing, said ignition timing control means including:

basic value-calculating means for calculating a basic value of the knocking limit ignition timing corresponding to a limit beyond which knocking occurs in the engine;

EGR-dependent knocking correction amount-calculating means for calculating an EGR-dependent knocking correction amount according to the EGR ratio;

temperature-dependent knocking correction amount-calculating means for calculating a temperature-dependent knocking correction amount according to a difference between the reference in-cylinder gas temperature and the in-cylinder gas temperature; and knocking limit ignition timing-calculating means for calculating the knocking limit ignition timing by correcting the basic value with the EGR-dependent knocking correction amount and the temperature-dependent knocking correction amount.

7. The control system according to claim 6, wherein said ignition timing control means further includes optimum ignition timing-calculating means for calculating an optimum ignition timing at which an output of the engine becomes maximum, according to the EGR ratio, and controls the ignition timing using one of the knocking limit ignition timing and the optimum ignition timing, which is more retarded.

8. A method of controlling an internal combustion engine that draws air into a cylinder via a throttle valve provided in an intake passage, and performs internal EGR for recirculating exhaust gases of the engine, which have been caused to flow back from an exhaust passage into the intake passage by overlap of an intake valve and an exhaust valve, into the cylinder, the method comprising the steps of:

a) detecting a rotational speed of the engine;

b) detecting an intake pressure in the engine;

c) calculating a reference in-cylinder gas amount, which is an amount of gases filled in the cylinder in a reference state in which the throttle valve is fully open, according to the rotational speed of the engine;

d) calculating an ideal in-cylinder gas amount, which is an amount of gases filled in the cylinder in an ideal state in which it is assumed that no exhaust gases of the engine are recirculated into the cylinder, according to the reference in-cylinder gas amount and the intake pressure;

e) calculating a temperature of in-cylinder gases in the ideal state;

f) calculating a temperature of actual in-cylinder gases filled in the cylinder;

g) calculating an amount of in-cylinder gases actually filled in the cylinder, by correcting the ideal in-cylinder gas amount using the ideal in-cylinder gas temperature according to the in-cylinder gas temperature;

h) obtaining an intake air amount actually drawn into the cylinder; and i) calculating an EGR ratio, which is a ratio of an EGR amount to the in-cylinder gas amount, using the in-cylinder gas amount and the intake air amount.

9. The method according to claim 8, further comprising the steps of:

j) detecting a temperature of air drawn into the cylinder as an intake air temperature;

k) obtaining a temperature of exhaust gases of the engine as an exhaust gas temperature by detecting or estimating the temperature of the exhaust gases; and l) calculating an internal EGR amount using the ideal in-cylinder gas temperature, the ideal in-cylinder gas amount, the intake air temperature, the intake air amount, and the exhaust gas temperature, and wherein in the step f), the in-cylinder gas temperature is calculated based on the intake air amount, the intake air temperature, the internal EGR amount, and the exhaust gas temperature.

10. The method according to claim 9, wherein the engine includes a variable intake and exhaust valve operation phase mechanism for changing the internal EGR amount by changing operation phases of the intake valve and the exhaust valve, and wherein relationships between the rotational speed of the engine and the operation phases of the intake valve and the exhaust valve, and the reference in-cylinder gas amount and a reference in-cylinder gas temperature, which is a temperature of in-cylinder gases in the reference state, are set and stored, based on measured data of an experiment performed in advance, and elements of the engine, the method further comprising the step of:

m) obtaining the operation phases of the intake valve and the exhaust valve, and wherein the reference in-cylinder gas amount is calculated in the step c), and the reference in-cylinder gas temperature is calculated as the ideal in-cylinder gas temperature in the step e), based on the stored relationships, according to the detected rotational speed of the engine and the obtained operation phases of the intake valve and the exhaust valve.

11. The method according to claim 10, wherein the reference in-cylinder gas amount is set as the sum of the intake air amount in the reference state and a remaining burned gas amount of remaining burned gases remaining in the cylinder in a state in which a piston of the cylinder is in a top dead center position.

12. The method according to claim 9, wherein the engine further includes an external EGR device that performs external EGR for recirculating exhaust gases discharged from the cylinder into the exhaust passage, into the intake passage via an EGR passage, the method further comprising:

n) calculating an external EGR amount; and 0) detecting or estimating an external EGR temperature, and wherein in the step f), the in-cylinder gas temperature is calculated further using the external EGR amount and the external EGR temperature.

13. The method according to claim 8, further comprising the steps of:

p) calculating a basic value of a knocking limit ignition timing corresponding to a limit beyond which knocking occurs in the engine;

q) calculating an EGR-dependent knocking correction amount according to the EGR ratio;

r) calculating a temperature-dependent knocking correction amount according to a difference between the reference in-cylinder gas temperature and the in-cylinder gas temperature;

s) calculating the knocking limit ignition timing by correcting the basic value with the EGR-dependent knocking correction amount and the temperature-dependent knocking correction amount; and t) controlling an ignition timing of the engine using the knocking limit ignition timing.

14. The method according to claim 13, wherein in the step t), an optimum ignition timing at which an output of the engine becomes maximum is calculated, according to the EGR ratio, and the ignition timing is controlled using one of the knocking limit ignition timing and the optimum ignition timing, which is more retarded.

\* \* \* \* \*